United States Patent
Suzuki et al.

(10) Patent No.: US 8,573,642 B2
(45) Date of Patent: Nov. 5, 2013

(54) AIRBAG DEVICE

(71) Applicant: Nihon Plast Co., Ltd., Shizuoka (JP)

(72) Inventors: Masato Suzuki, Shizuoka (JP); Hiroyuki Iwamoto, Shizuoka (JP)

(73) Assignee: Nihon Plast Co., Ltd., Fujinomiya (JP)

( * ) Notice: Subject to any disclaimer, the term of this patent is extended or adjusted under 35 U.S.C. 154(b) by 0 days.

(21) Appl. No.: 13/749,258

(22) Filed: Jan. 24, 2013

(65) Prior Publication Data

US 2013/0229004 A1 Sep. 5, 2013

Related U.S. Application Data

(62) Division of application No. 13/240,691, filed on Sep. 22, 2011, now Pat. No. 8,382,154.

(30) Foreign Application Priority Data

Sep. 22, 2010 (JP) ................................. 2010-211959
Nov. 30, 2010 (JP) ................................. 2010-266693

(51) Int. Cl.
*B60R 21/30* (2006.01)
*B60R 21/16* (2006.01)

(52) U.S. Cl.
USPC ........................................ 280/739; 280/743.1

(58) Field of Classification Search
USPC ............ 280/739, 743.1, 736, 740, 741, 743.2
See application file for complete search history.

(56) References Cited

U.S. PATENT DOCUMENTS

| 5,016,913 | A | * | 5/1991 | Nakajima et al. | 280/738 |
| 7,083,191 | B2 | * | 8/2006 | Fischer | 280/739 |
| 7,364,192 | B2 | * | 4/2008 | Braun et al. | 280/739 |
| 7,722,080 | B2 | * | 5/2010 | Rose et al. | 280/743.2 |
| 7,946,613 | B2 |   | 5/2011 | Rose et al. |  |
| 2003/0057691 | A1 | * | 3/2003 | Tokita et al. | 280/743.2 |
| 2007/0284864 | A1 | * | 12/2007 | Anaya et al. | 280/743.1 |
| 2009/0160171 | A1 | * | 6/2009 | Nam et al. | 280/743.2 |

FOREIGN PATENT DOCUMENTS

| JP | 2002-193058 A | 7/2002 |
| JP | 2005-014861 A | 1/2005 |
| JP | 2009-196551 A | 9/2009 |

* cited by examiner

*Primary Examiner* — Faye M. Fleming
(74) *Attorney, Agent, or Firm* — Arent Fox LLP

(57) ABSTRACT

The present invention provides an airbag device that is capable of restraining a rectification cloth that switches a vent hole to an opened or closed state so as not to be twisted, and that is capable of switching the vent hole from an opened state to a closed state, and further, switching to the opened state. At an initial stage at which an airbag main body inflates and expands, the vent hole 8 is arranged between the leg portions 5, and when the airbag main body is in a predetermined internal pressure state, the vent hole is closed by means of the band-shaped portion 4. If an occupant or the like comes into contact with the airbag main body, a tense state of each of the leg portions is released, the rectification cloth is established in a slackened state, and the vent hole 8 is established in an opened state.

2 Claims, 14 Drawing Sheets

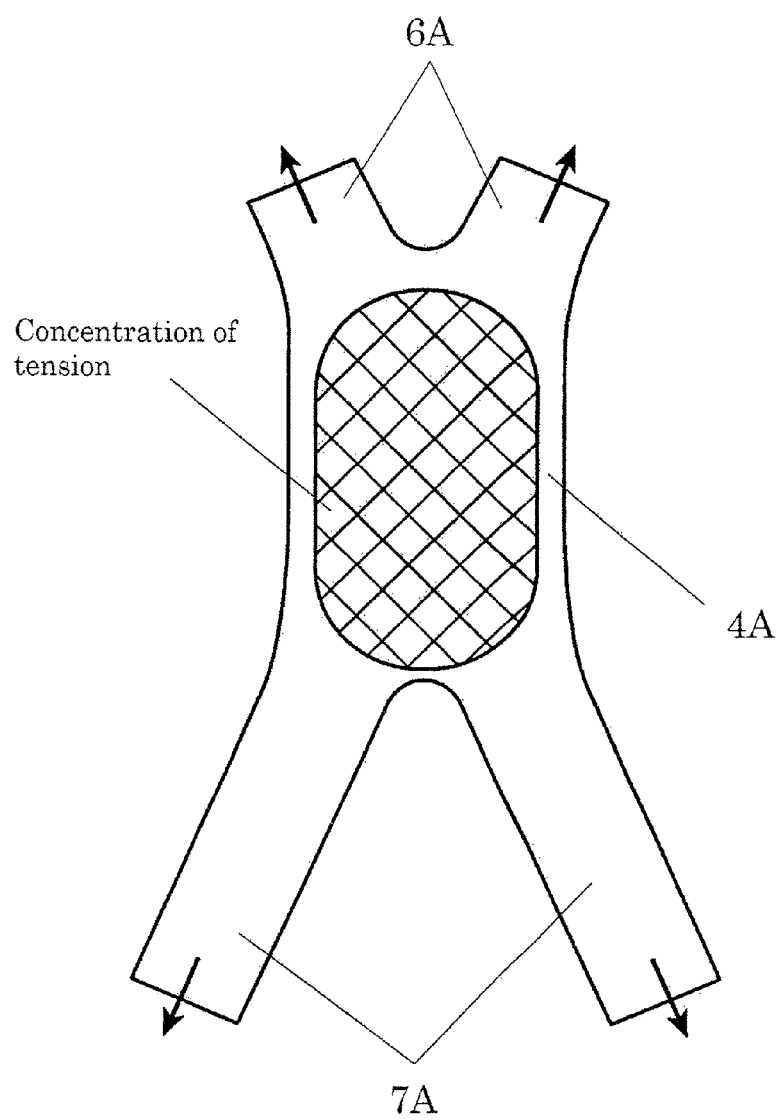

AIRBAG DEVICE

CROSS-REFERENCE TO RELATED APPLICATIONS

This is divisional application of U.S. patent application Ser. No. 13/240,691 filed Sep. 22, 2011, which claims priority of Japanese Patent Application No. 2010-211959, filed on Sep. 22, 2010 and Japanese Patent Application No. 2010-266693, filed in Nov. 30, 2010, the disclosure of the prior applications are hereby incorporated in their entirety by reference.

BACKGROUND OF THE INVENTION

1. Field of the Invention

The present invention relates to an airbag device having an airbag that is capable of being inflated and expanded by means of a gas that is supplied from a gas generator such as an inflator if a collision of a vehicle or the like occurs. In particular, the present invention relates to an airbag device that is capable of preventing twisting of a tether configured to open or close a vent hole; that is capable of making inflation and expansion speedily while restraining gas evacuation from the airbag at an initial stage at which the airbag inflates and expands to thereby set an inside of the airbag at a predetermined internal pressure; and that is capable of reliably making gas evacuation when an occupant or the like comes into contact with the airbag. In addition, the present invention relates to an airbag that is mounted in a vehicle, and that is capable of making airbag expansion that is suitable for occupant.

2. Description of the Related Art

Conventionally, in a vehicle such as an automobile, an airbag device has been installed in order to protect occupant from an impact if a vehicle collision occurs. A variety of models of airbag devices have been practically available to protect occupant at a rear passenger sheet or to protect pedestrian, or to protect occupant from an impact if a collision of a side face of a vehicle occurs or if a roll of a vehicle sideways occurs, as well as to protect a driver or an occupant at a passenger sheet. In addition, the shapes or the like of airbags are formed differently in accordance with an installation location or usage.

Many airbag devices are constructed to inflate and expand a baggy airbag by means of a high-pressure gas that is generated from a gas generator if a vehicle collision occurs, to thereby absorb and alleviate an impact caused by the collision or the like by means of the airbag. In this way, such airbags employ a construction for protecting occupant from an impact or the like.

Such airbag devices are constructed to inflate and expand an airbag momentarily by means of a high-pressure gas that is ejected from a gas generator and then appropriately release the gas inside of the airbag at a stage of constraining occupant so as to be thereby able to adjust a pressure inside the airbag and then effectively constrain occupant.

As a construction that appropriately releases the gas inside the airbag, there has been employed a construction that forms a vent hole for gas evacuation at an airbag main body. A variety of constructions of a gas evacuation portion via a vent hole has been conventionally proposed. For example, there has been proposed an airbag device for passenger seat, which is capable of restraining gas evacuation by increasing a ventilation resistance from a vent hole at an initial stage of inflation and expansion of an airbag, and that is capable of fully opening the vent hole at a later stage of the inflation and expansion (refer to Japanese Unexamined Patent Application Publication No. 2002-193058), or alternatively, an airbag device for vehicle, which is capable of effectively protecting a head of occupant even in either case where the occupant takes a seatbelt in a construction to open or close a vent hole with the use of a tether or not (refer to Japanese Unexamined Patent Application Publication No. 2009-196551) or the like.

With reference to FIG. 6, the airbag device for passenger seat, described in Japanese Unexamined Patent Application Publication No. 2002-193058, will be described as related art 1 of the present invention. As shown in FIG. 6, a part of a suspension cord main body portion 32 is pulled out from a gas evacuation opening 31 that is formed in an airbag 30 to the outside of the airbag 30 to thereby constitute a closed portion 33. At an initial stage at which the airbag 30 performs inflation and expansion, a ventilation resistance of the gas evacuation opening 31 is increased by means of the suspension cord main body portion 32 to thereby restrain gas evacuation.

In addition, at a later stage at which the inflation and expansion has been performed, the suspension cord main body portion 32 is completely pulled into the airbag 30 to be thereby able to set the gas evacuation opening 31 in a fully opened state. Then, a height dimension of the airbag 30 having performed inflation and expansion, i.e., a thickness of the airbag 30 receiving occupant is adapted to be able to be restrained by means of a suspension 34 that is pulled into the airbag 30.

This airbag device for passenger seat is capable of restraining a gas evacuation flow rate of the gas that is evacuated from the gas evacuation opening 31 in the course of inflation and expansion of the airbag 30, and is also capable of effectively utilizing an inflation gas for inflation and expansion of the airbag 30.

With reference to FIG. 7, the airbag device for vehicle, described in Japanese Unexamined Patent Application Publication 2009-196551, will be described as related art 2. As shown in FIG. 7, a tether 42 is arranged in an airbag 40 for passenger seat, and subsidiary vent holes 43 are formed at one pair of side portions 42A of the tether 42. At the forward side of each of the side portions 42A, a redundant portion 42 configured to expand by breakage of a tear seam 45 is formed. One pair of the side portions 42a is retained in a predetermined cable routing passageway along a guide 46, and the tether 42 is retained at an intermediate portion 42B so as to be disposed on a movement locus that a head of occupant who does not take a seatbelt traces.

When the airbag 40 for passenger seat has inflated and expanded, in a case where occupant has taken a seatbelt, an upper part of the body including the occupant's head is constrained by means of the seatbelt, and thus, the quantity of movement of the occupant's part to the forward side of the vehicle is limited. Therefore, the quantity of the occupant's part to get into the airbag 40 for passenger seat is reduced.

At this time, a compression force acting on the intermediate portion 42B of the tether 42 that is arranged in the airbag 40 for passenger seat becomes less than a predetermined value, failing to reach a breakage load of the tear seam 45 of the redundant portion 44. Thus, the redundant portion 44 is maintained as it is without being expanded, and in a side view, the subsidiary vent hole 41 is maintained in a state in which it is superimposed on a vent hole 41, i.e., in a state in which the vent hole 41 is opened. The gas in the airbag 40 for passenger seat is then continuously evacuated from the vent hole 41, so that an internal pressure of the airbag 40 for passenger seat can be appropriately kept.

When the airbag 40 for passenger seat has inflated and expanded, in a case where occupant has failed to take a seatbelt, the seatbelt configured to constrain an upper part of the body including the occupant's head from moving to the forward side of the vehicle has not been taken, and thus, the occupant's head moves to the forward side of the vehicle as it is. Therefore, the quantity of the occupant's head getting into the airbag 40 for passenger seat increases, and a compression force (a tension force) that acts on the intermediate portion 42B of the tether 42 becomes a predetermined value or more. The tear seam 45 having retained the redundant portion 44 then breaks.

Then, the redundant portion 44 expands, and one pair of side portions 42A at the left and right of the tether 42 is pulled to the side of the intermediate portion 42B. As a result, the subsidiary vent hole 43 that is formed in each of the side portions 42A moves to a position which is not superimposed on the vent hole 41, and the vent hole 41 of the airbag 40 for passenger seat is closed. In this manner, the internal pressure of the airbag 40 for passenger seat is maintained in a high state, and the upper part including the occupant's head can be appropriately constrained.

In the invention described in Japanese Unexamined Patent Application Publication No. 2002-193058, at the initial stage of inflation and expansion of the airbag 30, the ventilation resistance of the gas evacuation opening 31 is increased by means of a part of the suspension cord main body portion 32 that is pulled out from the gas evacuation opening 31 to the outside of the airbag 30 to be thereby able to restrain gas evacuation. In addition, at the later stage of the inflation and expansion, the suspension cord main body portion 32 is completely pulled into the airbag 30 to be thereby able to establish the gas evacuation opening 31 in a fully opened state. Moreover, the height dimension of the airbag 30 can be restrained by means of the suspension cord main body portion 32 that is pulled into the airbag 30.

However, a gas is always evacuated from the gas evacuation opening 31, and a further modification is required to further efficiently utilize the gas that is generated from the gas generator and then downsize the gas generator.

The invention described in Japanese Unexamined Patent Application Publication No. 2009-196551 is constructed so as to adjust gas evacuation with the use of the tether 42 formed in a linear shape. However, in a case where occupant has failed to take a seatbelt, when the side portions 42A are established in a distorted state, it becomes a situation that the vent hole 41 cannot be closed by means of the side portions 42A.

That is, each side portion 42A is arranged between one pair of side portions 46, and if twisting occurs between one pair of the side portions 46 or if twisting occurs at the intermediate portion 42B or the like of the tether 42, such each side portion 42A is also distorted due to the above twisting. Then, at a circumferential edge part of the vent hole 41, a site which is not covered with each of the side portions 42A is formed. If the internal pressure of the airbag 40 for passenger seat increases, a gas evacuation flow rate of the gas from the site that is not covered with each of the side portions 42A increases, an area of the side that is not covered with each of the side portions 42A increases, and the vent hole 41 is established in an opened state.

However, Japanese Unexamined Patent Application Publication No. 2009-196551 described above fails to disclose or suggest a solution or construction for prevention of a problem with twisting of the side portions 42A.

The present invention has been made to solve the conventional problem described above, and it is an object of the present invention to provide an airbag device, with a simple construction, that is capable of restraining a rectification cloth configured to switch a vent hole to an opened or closed state so as not to be distorted; that is capable of performing speedy inflation and expansion while restraining gas evacuation from an airbag at an initial stage at which the airbag inflates and expands; that is capable of reliably performing gas evacuation if occupant or the like comes into contact with the airbag partway of expansion and inflation; that is capable of stopping gas evacuation and maintaining an internal pressure of the airbag in a predetermined internal pressure state when the internal pressure of the airbag has reached at the predetermined pressure; and that is capable of reliably making gas evacuation if occupant or the like comes into contact with an airbag that has reached a predetermined internal pressure.

In addition, in order to alleviate an impact to occupant in a case of vehicle collision, a variety of airbags are known, and their mounting locations also increase. A variety of airbags are applied to many vehicles, including an airbag configured to expand forward of occupants taking a driver seat and a passenger seat in order to cope with collision from a front side or a side cushion-type airbag or a curtain-shaped airbag partially covering side portions of a vehicle in order to cope with collision of another vehicle with a side face or roll of vehicle sideways.

With the spread of such airbags, their effectiveness is verified in a very large number of actuation cases (collision cases), whereas a variety of attempts are made as to a modification for providing a protection that is further preferable as well.

As the related art according to the present invention, there exists an airbag that is inflated and expanded by means of a gas supplied from an inflator into a baggy bag main body, the airbag including: a variable vent hole in which a gas distribution state inside and outside of the bag main body is changed in accordance with an expansion state of the bag main body; and a distribution state change means for changing a gas distribution state in the variable vent hole, wherein the bag main body is expanded in a stepwise manner in a plurality of directions, the distribution state change means is established in an allowable state allowing for gas distribution in an initial expansion direction at an initial stage of inflation and expansion of the bag main body, and is configured to selectively set the allowable state and a restraint state restraining gas distribution inside and outside of the bag main body via the variable vent hole, at a subsequent stage of expansion that is subsequent to the initial stage of expansion, and that is in an expansion direction different from the initial expansion state (for example, refer to Japanese Unexamined Patent Application No. 2005-14861).

In Japanese Unexamined Patent Application No. 2005-14861 that is the related art, one linear base cloth valve is used to open or close a gas evacuation hole for evacuating a redundant gas for airbag inflation and expansion suitable for protection of occupant.

However, in the linear base cloth valve, the base cloth valve is thinned due to breakage or twisting of the base cloth valve at the time of the maximum inflation and expansion of an airbag, the gas evacuation hole is not well closed, and there is a possibility that suitable airbag expansion cannot be performed.

Therefore, there is a need to contrive a preferred folding method or a means for smoothing movement of the base cloth valve, airbag research and development or manufacturing stage becomes complicated, and there has been a problem associated with a higher cost.

Accordingly, it is an object of the present invention to provide an airbag that is capable of stably and easily making suitable airbag expansion that is a solution of the problem described above.

SUMMARY OF THE INVENTION

Object of the present invention is mainly characterized by an airbag device comprising an airbag that is inflated and expanded by means of gas supplied from a gas generator to constrain a target to be protected, wherein the airbag includes: an airbag main body having a vent hole for gas evacuation, a rectification cloth arranged at the airbag main body and configured to switch the vent hole from an opened state to a closed state and further to the opened state; and a guide base cloth having an opening, being engaged with the airbag main body, and guiding slide movement in a longitudinal direction of the rectification cloth, the opening being superimposed on the vent hole, the rectification cloth having a band-shaped portion and leg portions separately extending in a V-shape, from a partway in a longitudinal direction of the band-shaped portion, an end portion of the rectification cloth is engaged with the airbag main body, each of end portions of the leg portions is engaged with the airbag main body so that a partial portion of the rectification cloth can be protruded through the vent hole to an outside of the airbag main body, between the airbag main body and the guide base cloth, the band-shaped portion is configured to have a horizontal width dimension enough to open or close the vent hole or an opening of the guide base cloth, the guide base cloth has a first guide passageway configured to guide the band-shaped portion and one pair of second guide passageways, a respective one of which is configured to guide said each leg portion, the opening of the guide base cloth is formed in the first guide passageway, when the rectification cloth is in a state before inflation and expansion of the airbag main body, the vent hole or the opening of the guide base cloth is arranged between the leg portions of the rectification cloth, when an internal pressure of the airbag main body reaches a predetermined internal pressure after inflation and expansion of the airbag main body, the vent hole or the opening is closed by the band-shaped portion, and when the airbag main portion constrains the target and the rectification cloth slackens, the partial portion of the rectification cloth is protruded from the vent hole to the outside to make the vent hole in the opened state.

In addition, the present invention is mainly characterized by the airbag device, wherein a length dimension of the band-shaped portion from an end part of the band-shaped portion that is engaged with the airbag main body to a branch portion that is divided into the leg portions is formed of a length dimension that is equal to a length dimension from a position at which the end part of the band-shaped portion in the airbag main body is engaged to the branch portion of said one pair of second guide passageways in the guide base cloth.

Further, the present invention is mainly characterized by the airbag device, wherein the vent hole is formed at a back face side of the airbag main body, the guide base cloth is engaged with the back face side of the airbag main body, the end part of the band-shaped portion is engaged between a boundary region between the back face side of the airbag main body and an occupant side of the airbag main body and a site at which the guide base cloth is engaged, and each of the end portions of the leg portions is engaged with a site of an occupant constraint face in the airbag main body.

According to the present invention, a vent hole can be controlled from an opened state to a closed state by means of a rectification cloth, in accordance with an internal pressure of an airbag main body, and further, when a target to be protected comes into contact with the airbag main body that is established in a predetermined internal pressure state, the rectification cloth is established in a slacked state and then the vent hole can be controlled from the closed state to the opened state. That is, at an initial stage of inflation and expansion of the airbag main body, inflation and expansion of the airbag main body can be performed while gas evacuation from the airbag main body is performed. When the internal pressure of the airbag main body reaches a predetermined internal pressure state, the vent hole is closed by means of the rectification cloth that is established in a tense state and then the vent hole is established in a closed state, whereby the internal pressure of the airbag main body can be maintained in a predetermined internal pressure state.

A rectification cloth can be made of: a band-shaped portion; and leg portions that are divided in V-shape, from a partway in a longitudinal direction of the band-shaped portion. A guide base cloth that is engaged with an airbag main body, for guiding sliding movement of the rectification cloth, is configured to have a first guide passageway to guide the band-shaped portion of the rectification cloth and a pair of second guide passageways to respectively guide the leg portions that are divided into two ways. An opening of the guide base cloth that is superimposed on a vent hole is formed in the first guide passageway.

With such a construction, if a rectification cloth is moved in a direction in which a band-shaped portion is pulled out from a first guide passageway and then an expandable redundant portion of the band-shaped portion is established in a slackened state, a vent hole can be disposed so as to be opened between leg portions that are divided into two ways of the rectification cloth. In addition, if the rectification cloth is moved in a direction in which each of the leg portions is pulled out from a respective one of second guide passageways and then the redundant portion of the band-shaped portion is caused to enter the first guide passageway, a vent hole or an opening of a guide base cloth can be closed by means of the band-shaped portion.

If the airbag main body performs inflation and expansion, the rectification cloth to close the vent hole is established in a state in which the cloth is pulled in a horizontal direction by means of the leg portions that are divided into two ways. In addition, the band-shaped portion is established in a state in which it is pulled in a vertical direction by means of an end part of the rectification portion and end portions of the leg portions.

That is, a tensile force in the horizontal direction and a tensile force in the vertical direction act on the rectification cloth at the same time, the band-shaped portion can be maintained in an always opened state without twisting of the rectification cloth. Then, the vent hole can be reliably closed by means of the band-shaped portion having a predetermined width.

When an occupant, for example, comes into contact with the airbag main body that has been maintained in a predetermined internal pressure state, the tensile state of the rectification is loosened and then the rectification cloth slackens, enabling the rectification cloth having closed the vent hole to move in a direction of opening the vent hole. The vent hole can be then established in an opened state again. At this time, with an internal pressure rise in the airbag main body, a part of the rectification cloth protrudes from the vent hole to the outside, and the vent hole can be established in an opened state.

The gas that is filled in the airbag main body is then evacuated from the opened vent hole to the outside, whereby a more preferred resistance force is imparted to an occupant or the like having come into contact with the airbag main body, and the occupant can be softly constrained.

As a site at which the rectification cloth is to be arranged, the rectification cloth can be arranged at the outside of the airbag main body or can be arranged inside of the airbag main body. Even in a case where the rectification cloth is arranged outside or inside of the airbag main body, at a stage at which the internal pressure of the air bag main body reaches a predetermined internal pressure state, the vent hole can be established in an opened state by means of the leg portions that are divided into two ways of the rectification cloth.

At the stage at which the internal pressure of the airbag main body reaches a predetermined internal pressure state, the band-shaped portion is established in a state in which the vent hole is closed by means of the rectification cloth that is established in a tensile state. In addition, when an occupant or the like comes into contact with the airbag main body that is established in a predetermined internal pressure state, the tensile state of the rectification cloth is slackened due to contact of the occupant or the like, enabling the rectification cloth having closed the vent hole to move in a direction of opening the vent hole, and the vent hole can be established in an opened state again.

If the rectification cloth having closed the vent hole partially opened the vent hole, the gas in the airbag main body increases an outflow rate at which the gas flows out from the partially opened vent hole to the outside, and an opened area can be further increased. Then, a part of the rectification cloth can be protruded from the vent hole or an opening of the guide base cloth to the outside, and the vent hole can be established in an opened state.

Incidentally, while in vehicle running or the like, a driver or an occupant at a passenger seat or the like does not always keep an appropriate riding position or a riding posture, and body sizes or the like are respectively different depending on occupants. For example, a driver sometimes drives in a state of extreme forward inclination posture in which an upper part of the body is made proximal to the steering wheel (this state is referred to as "Out of position", and is hereinafter abbreviated as an OOP).

At an initial stage at which the airbag main body inflates and expands, in a case where an occupant established in the OOP state comes into contact with the airbag main body, the vent hole at this time is not completely closed by means of the rectification cloth, and is established in a partially opened state by means of the leg portions that divided into two ways. Therefore, even if the internal pressure of the airbag main body is increased due to contact of the occupant, the opened state of the vent hole is maintained. Then, the occupant can be kept in a state in which a resistance force relative to the occupant is reduced.

Therefore, according to the present invention, in a state that is capable of coping with the OOP state, when an occupant comes into contact an airbag, the internal pressure rise of the airbag main body can be restrained. In addition, inflation and expansion of the airbag main body advances in a state in which a load on the occupant coming into contact with the airbag main body is low. Moreover, during a period in which there is a high possibility that the occupant established in the OOP state comes into contact with the airbag main body, i.e., from the start of inflation and expansion of the airbag main body to the end of the initial stage, the vent hole is not closed. Therefore, a state in which gas is evacuated from the airbag main body is kept, and a state in which the load on the occupant coming into contact with the airbag main body is low can be maintained.

After the elapse of a period of time in which there is a high possibility that the occupant established in the OOP state comes into contact with the airbag main body, i.e., after the elapse of the initial stage at which the airbag main body has started inflation and expansion, the rectification cloth is established in a tensile state by means of inflation and expansion of the airbag cloth, and a current state is transferred to a state in which a vent hole is closed. That is, appropriate countermeasure can be taken presupposing that an occupant is in an appropriate riding state. Then, when the internal pressure of the airbag main body reaches a predetermined internal pressure state, the vent hole can be closed by means of the rectification cloth.

That is, the vent hole can be established in an opened state at the initial stage at which the airbag main body has start inflation and expansion, or alternatively, the vent hole can be established in a close state when the internal pressure of the airbag main body reaches a predetermined internal pressure state without an occupant or the like coming into contact with the airbag main body partway of inflation.

In addition, even when an occupant or the like comes into contact with the airbag main body partway of inflation, the vent hole is maintained in its opened state, so that a gas excavation flow rate of the gas that is evacuated through the vent hole with an internal pressure rise of the airbag main body can be increased. Then, the occupant can be kept in a state in which a resistance force relative to the occupant is reduced.

Further, after the internal pressure of the airbag main body has reached a predetermined internal pressure state, when an occupant or the like comes into contact with the airbag main body, the tensile state of each of the leg portions keeping the vent hole in a closed state is loosened, so that the vent hole can be established in a fully opened state, as described above.

According to the present invention, a length dimension of a band-shaped portion before being branched into the leg portions can be formed to be a length dimension that is substantially equal to a length dimension from a position at which an end part of the band-shaped portion in the airbag main body is engaged with a branch portion of one pair of second guide passageways. With such a construction, a vent hole can be reliably established in an opened state at the initial stage at which the airbag main body starts inflation and expansion, or alternatively, the vent hole can be reliably established in an opened state when the internal pressure of the airbag main body reaches a predetermined internal pressure state without an occupant or the like coming into contact with the airbag main body partway of inflation.

According to the present invention, sites at which an end part of the band-shaped portion and end portions of the leg portions are engaged with the airbag main body are respectively formed at their predetermined sites, whereby when an occupant or the like comes into contact with the airbag main body that is established in a predetermined internal pressure state, contact of the occupant or the like with the airbag main body is sensitively reacted and then the tensile state of the rectification cloth can be loosened. Then, the band-shaped portion of the rectification cloth having closed the vent hole is allowed to move in a direction of opening the vent hole, and the vent hole can be established in an opened state again between the leg portions.

Object of the present invention is directed to an airbag according to claim 5, and is described as follows.

An airbag device including an airbag that is folded, and that is expanded by means of an inflation gas that is supplied from an inflator, wherein the airbag has a gas excavation hole and a pulling member that is a base cloth valve configured to open or close the gas evacuation hole, wherein the pulling member has: a first mount portion that is mounted on an occupant-side airbag portion when the gas evacuation hole is defined as a center; a second mount portion that is mounted on a vehicle-side airbag portion when the evacuation hole is defined as a center or that is mounted on a vehicle; and a closed portion that is disposed to be able to be superimposed on the gas evacuation hole;

wherein the pulling member that is the base cloth valve is moved to be pulled by means of relative spacing between the occupant-side airbag portion and the vehicle-side airbag portion, and the closed portion is formed so as to be at least partially superimposed on the gas evacuation hole or so as to move to a restrictive position, and wherein the first mount portion is formed by a plurality of mount pieces, is mounted at a plurality of mount points at a occupant side, and is configured so that a distance between the plurality of mount portions is large relative to a dimension in an original shape of the plurality of mount pieces of the pulling member that is the base cloth valve.

The present invention that is capable of solving the problem described above is directed to an air bag according to claim 6, and is described as follows.

An airbag in which the first mount portion and the second mount portion are respectively formed by a plurality of mount pieces, in addition to the invention according to claim 5.

The airbag according to the present invention has the configuration as described above, and thus, has advantageous effects described below.

(1) The airbag of the present invention is structured to open, close, and open a gas evacuation hole for evacuating a redundant gas in order to achieve airbag inflation and expansion suitable for occupant, a pulling member that is a base cloth valve is formed by a first mount portion and a second mount portion, whereby tension of the gas evacuation hole can be concentrated at a predetermined site, outflow of the gas from the gas evacuation hole can be restrained, and suitable airbag expansion can be stably performed.

(2) By providing a pulling protection member, the pulling member is prevented from floating at the time of airbag expansion, and gas outflow can be restrained to achieve more suitable airbag expansion.

(3) The pulling member can be configured by linearly cutting a base cloth at the time of manufacture of an airbag, thus improving yields.

(4) A first mount portion and a second mount portion of the pulling member are mounted in an airbag after these mount portions have been divided into a plurality of ways (for example, after the first mount portion has been divided into two ways); and therefore, a two-way portion of the pulling member can be mounted while being kept away from a suspension cord for preventing excessive inflation of the airbag, the suspension cord being generally provided in the airbag.

BRIEF DESCRIPTION OF THE DRAWINGS

FIG. 3 (*b*) is a sectional view of essential portions shown in FIG. 3 (*a*) (first embodiment);

FIG. 4 (*b*) is a sectional view of essential portions shown in FIG. 4 (*a*) (first embodiment);

FIG. 5(*b*) is a sectional view of essential portions shown in FIG. 5(*a*) (first embodiment);

FIG. 14 is an explanatory view showing an advantageous effect of a pulling member of another example of the airbag according to the present invention.

DESCRIPTION OF THE PREFERRED EMBODIMENTS

The preferred embodiments of the present invention will be specifically described below with reference to the accompanying drawings. An airbag device according to the present invention will be described hereinafter by way of example of airbag main body formed in a baggy shape. The airbag device according to the present invention is not limitative to the construction in which the airbag main body is formed in a variety of airbags such as a single baggy shape, and the present invention is preferably applicable to a side air bag having a subsidiary air bag body, a side curtain air bag, an airbag for rear seat, a front curtain airbag, or an outside airbag. Therefore, the present invention is not limitative to the embodiments described hereinafter, and a variety of modification can be made.

First Embodiment

A construction of an airbag main body 10 according to the present invention will be described with reference to FIG. 1 to FIG. 5. An inflator mount portion 13 in the airbag main body 10 is shown, although an inflator that is arranged at a back face side of the airbag main body 10 is not shown.

Figure 1:
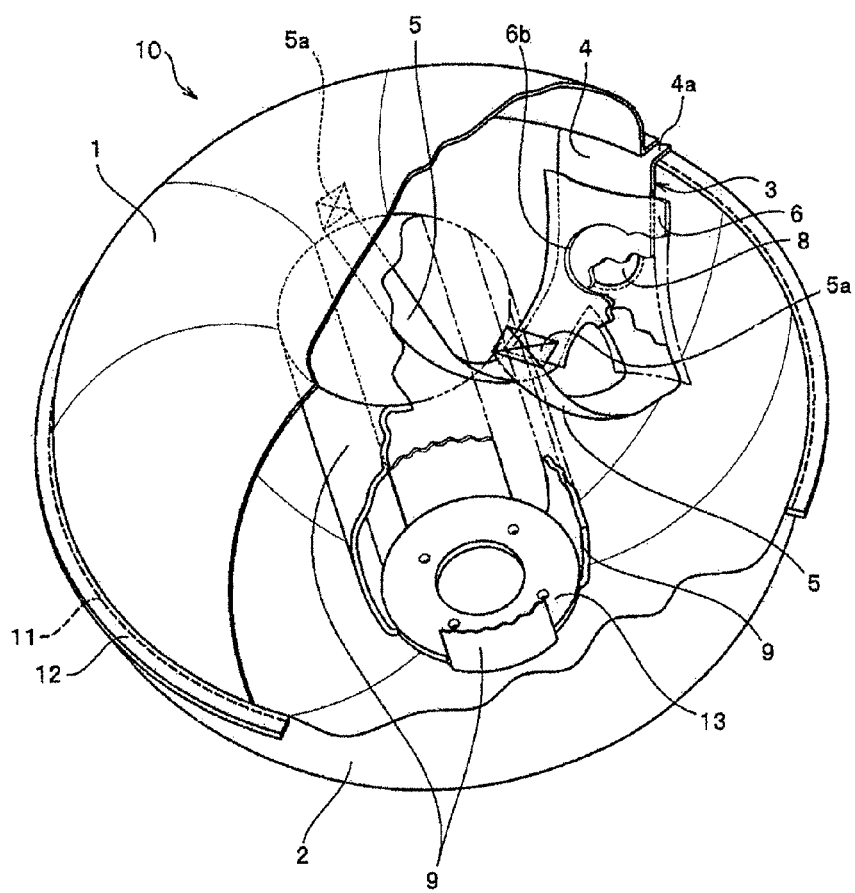
FIG. 1 is a perspective view of essential portions, showing an inside of an airbag main body from an occupant constraint face side after breaking a part of the airbag main body (first embodiment)

As shown in FIG. 1, in the airbag main body 10, an outer circumferential edge of a main panel 2 at a wind shield side and an outer circumferential edge of a main panel 1 at an occupant constraint face side are superimposed on an ear portion 12, and the ear portion 12 is sewn at a sewing portion 11. An inflator, although not shown, is configured to be mountable on an inflator mount portion 13 that is provided on the main panel 2. On the main panel 2, a vent hole 8 is formed, and in the airbag main body 10, a rectification cloth 3 configured to open or close the vent hole 8 is provided. The airbag main body 10 is constructed with the main panel 1 and the main panel 2.

The airbag main body 10 is made of a non-ventilation flexible material, and for example, is formed by sewing a nylon-based base cloth panel, an inside of which is rubber-coated, that is, by sewing the main panels 1 and 2 in a baggy shape. While a disk-shaped construction is shown as a construction of the airbag main body 10, this construction is merely provided as an example, and another configuration can be employed as long as it is required for an airbag. In addition, the rectification cloth 3 is constructed with a band-shaped tether made of a material that is similar to that for the main panels 1 and 2. The rectification cloth 3 can also be constructed by employing another material as required.

Hereinafter, while a description will be given by employing a mount construction by sewing as a construction to mount the rectification cloth 3 and the guide base cloth 6 on the airbag main body 10, the present invention is not limitative to the mount construction by sewing, and the rectification cloth 3 and the guide base cloth 6 can be mounted on the back main body 10 by employing another publicly known mounting method.

Figure 2:
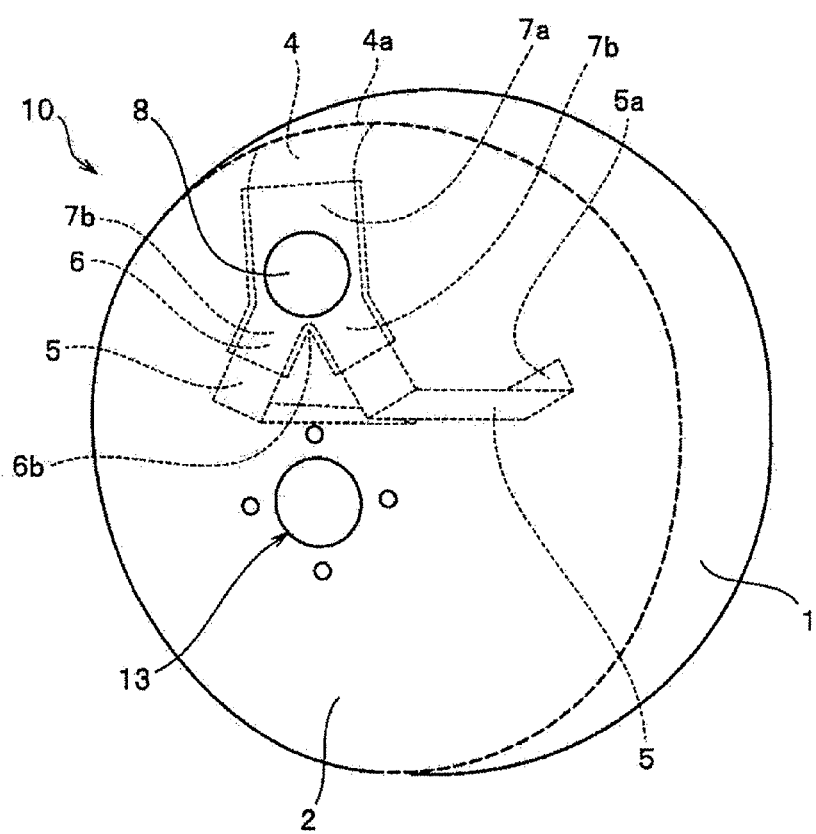
FIG. 2 is a perspective view showing an inside of the airbag main body from a wind shield side (first embodiment)

As shown in FIG. 1 and FIG. 2, a control mechanism for switching the vent hole 8 in an opened or closed state is made of: a guide base cloth 6 forming an opening 6b at a position that is superimposed on an opening of the vent hole 8; and a rectification cloth 3, a sliding direction of which is restrained by means of the guide base cloth 6. A size of the opening 6b formed in the guide base cloth 6 can be formed as a size that is substantially equal to that of the opening of the vent hole 3 or as a size that is approximate thereto.

The rectification cloth 3 is provided with: a band-shaped portion 4 having a predetermined width; and one pair of leg portions 5 that are continuously divided into two ways at the band-shaped portion 4. An end part 4a of the band-shaped portion 4 is sewn at an ear portion 12, and an end portions 5a of each of the leg portions 5 is sewn in an occupant constraint face in the main panel 1 or at the periphery of the occupant constraint face.

The guide base cloth 6 is configured in a shape that is provided with: a first guide passageway 7a configured to guide the band-shaped portion 4 of the rectification cloth 3; and one pair of second guide passageways 7b respectively configured to guide one pair of leg portions 5, and in the first guide passageway 7a, an opening 6b superimposed on an opening of a vent hole 8 is formed. The guide base cloth 6 is sewn on the main panel 2 by means of a sewing portion 11 so that the first guide passageway 7a and each of the second guide passageways 7b.

As a length dimension in the band-shaped portion 4 of the rectification cloth 3, a length dimension from an end part 4a of the band-shaped portion 4 to a two-way portion 5b into which the leg portions 5 are divided can be formed to be a length dimension that is substantially equal to a length dimension from a position at which the end part 4a of the band-shaped portion 4 in the main panel 2 is engaged to a two-way portion 6a of the guide base cloth 6 that is engaged with the main panel 2.

Figure 3:
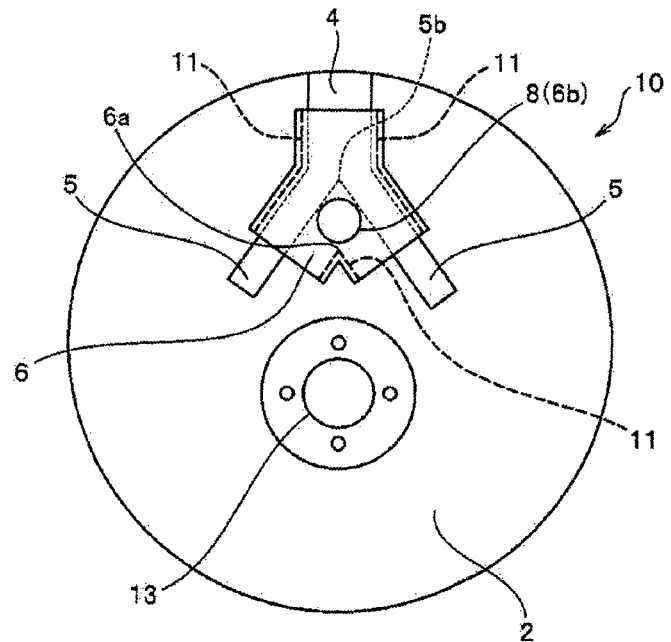
FIG. 3(*a*) is a plan view of a vent hole and its periphery in the airbag main body at an initial stage of inflation and expansion (first embodiment)
Figure 3:
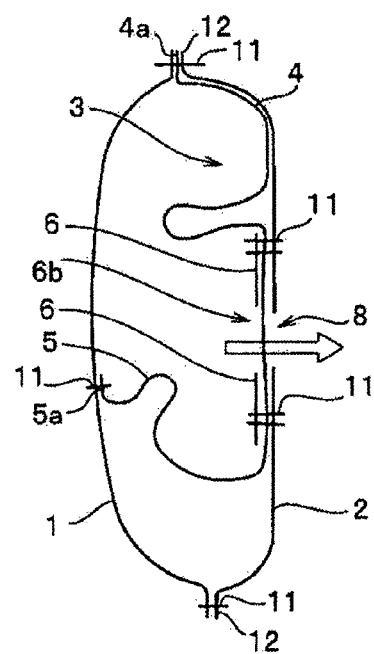

By forming the above length dimension in this way, at an initial stage at which the airbag main body 10 starts inflation and expansion, as shown in FIGS. 3 (a) and 3 (b), a redundant portion on the side of the end part 4a of the band-shaped portion 4 can be slackened, and the two-way portion 5b of one pair of the leg portions 5 can be established in a state in which the two-way portion fails to reach the opening of the vent hole 8 or the opening 6b of the guide base cloth 6. In addition, at a stage at which the airbag main body 10 inflates and expands and then reaches a predetermined internal pressure state, as shown in FIGS. 4 (a) and 4 (b), the opening of the vent hole 8 or the opening 6b of the guide base cloth 6b can be closed by means of the band-shaped portion 4.

Figure 4:
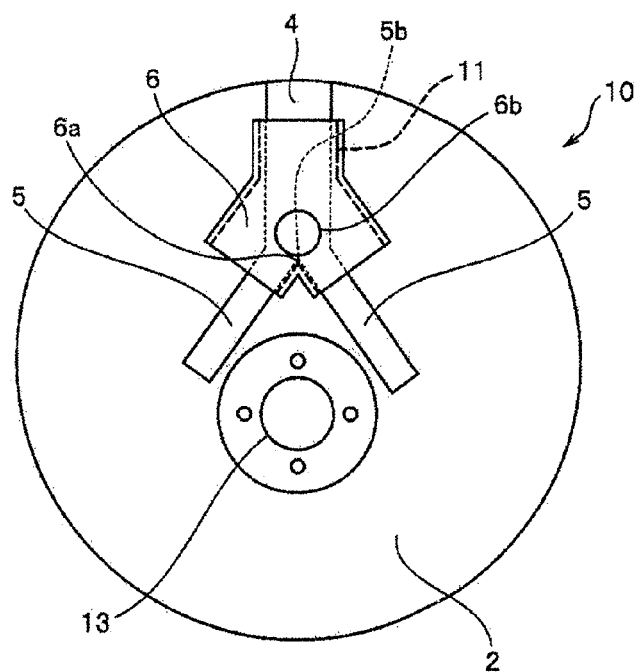
FIG. 4(*a*) is a plan view of a vent hole and its periphery in the airbag main body in a state in which an internal pressure of the airbag main body reaches a predetermined internal pressure state (first embodiment)
Figure 4:
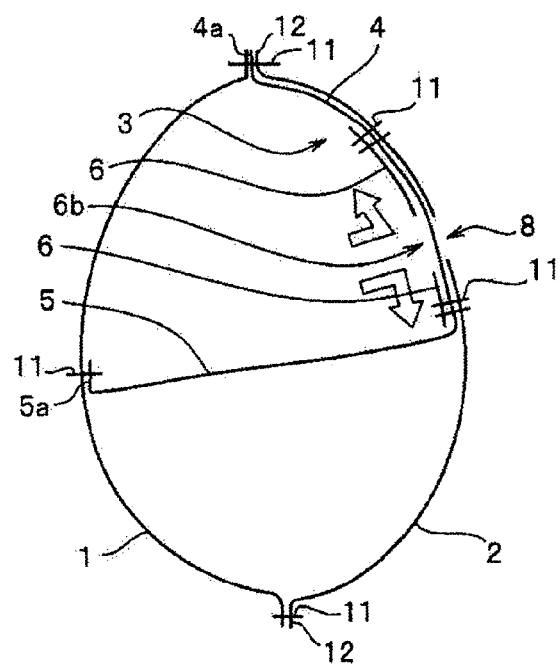
Figure 5:
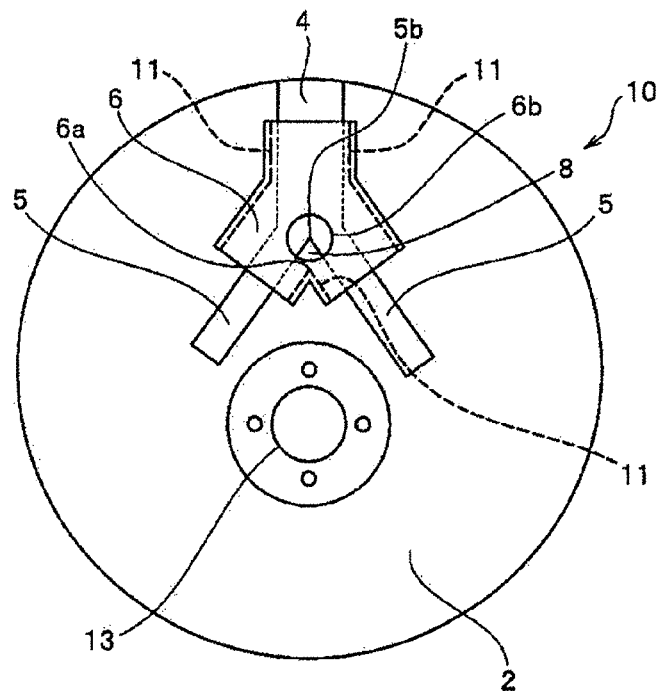
FIG. 5(*a*) is a plan view of a vent hole and its periphery in the airbag main body, in a state in which a target to be protected comes into contact with the airbag main body that is established in a predetermined internal pressure state (first embodiment)
Figure 5:
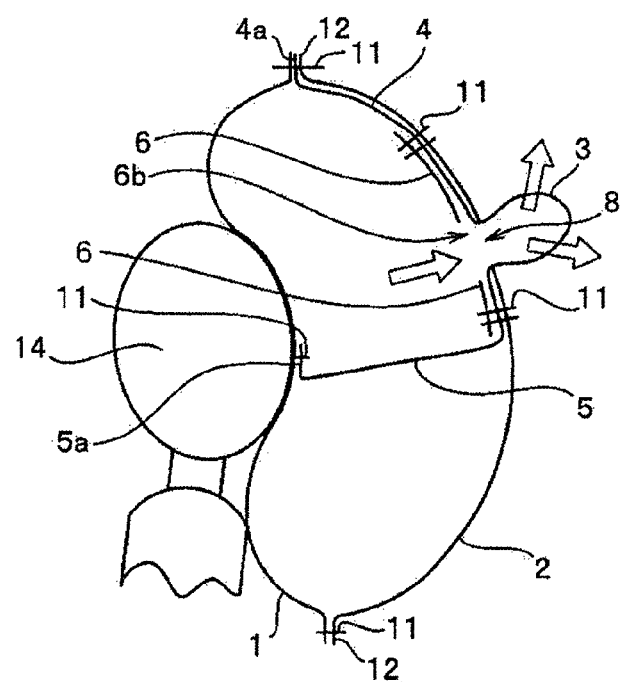
Figure 6:
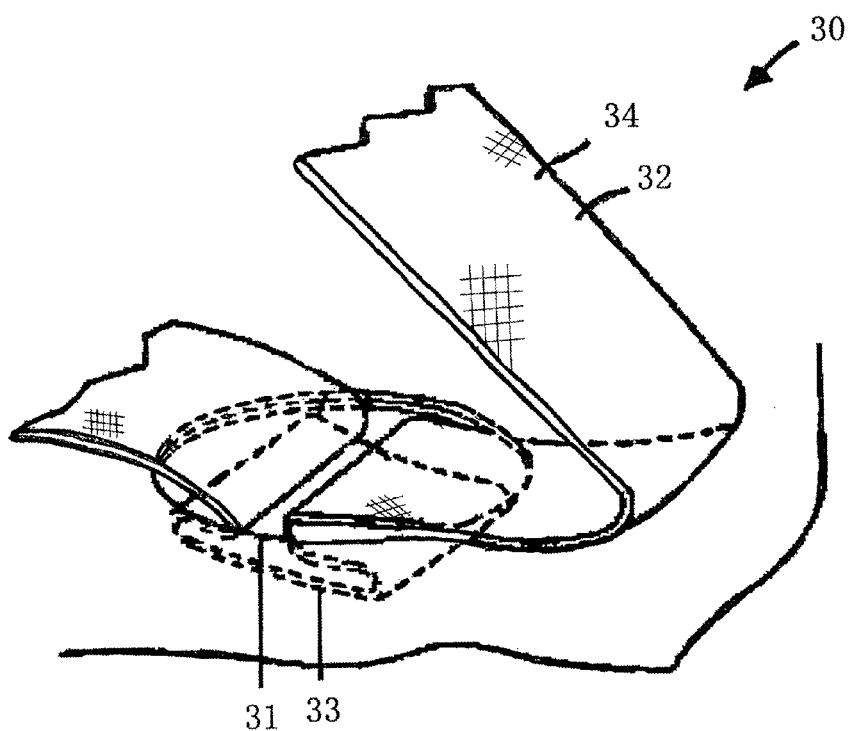
FIG. 6 is a perspective view of essential portions of a vent hole and its periphery (related art 1)
Figure 7:
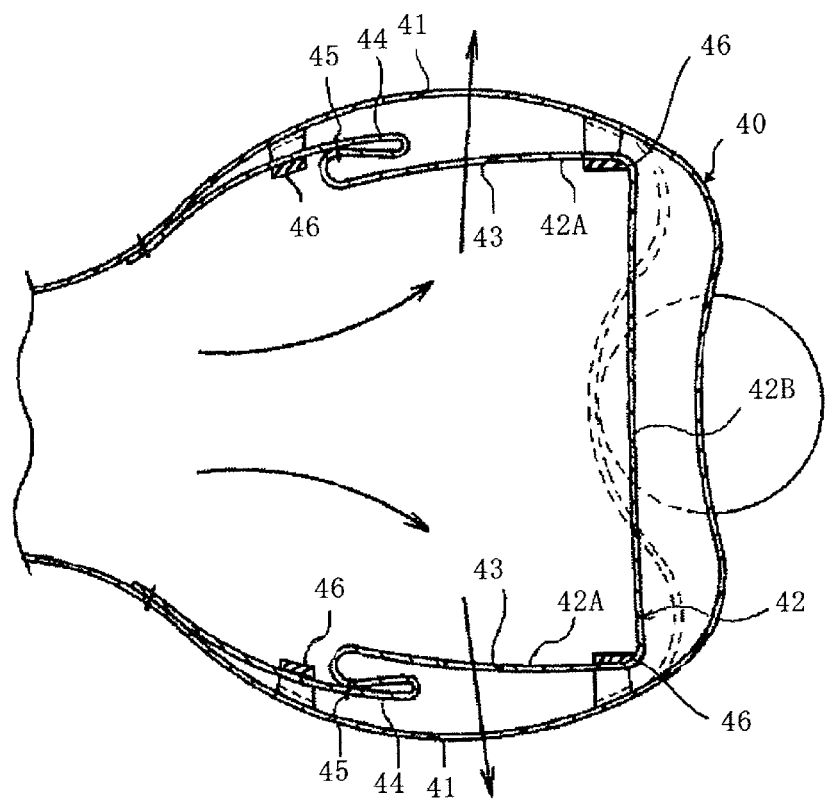
FIG. 7 is a horizontal cross section of an airbag for passenger seat (related art 2)

FIG. 3 (a), FIG. 4 (a), and FIG. 5 (a) each show a state in the airbag main body 10 in a state in which the main panel 1 on the occupant constraint face side is not shown. FIG. 3 (b), FIG. 4 (b), and FIG. 5 (b) each show a longitudinal cross section of the airbag main body 10 while the periphery of the vent hole 8 is enlarged, and a schematically enlarged view is employed to clarify the construction. In FIG. 3 (b), FIG. 4 (b), and FIG. 5 (b), a construction of a protrusion dimension restraining tether 9 shown in FIG. 1 is not shown.

In addition, a length dimension in one pair of leg portions 5 can be formed to be a length dimension such that the band-shaped portion 4 and one pair of leg portions 5 can be established in a tensile state at a stage at which the airbag main body 10 inflates and expands and then reaches a predetermined internal pressure state. At this time, in the band-shaped portion 4, a tensile force in a horizontal direction and a tensile force in a vertical direction are caused to act at the same time by means of one pair of leg portions 5, so that the opening of the vent hole 8 or the opening 6b of the guide base cloth 6 can be closed without twisting of the band-shaped portion 4.

As shown in FIG. 1, on the occupant constraint face in the main panel 1, a protrusion quantity is restrained by means of a plurality of protrusion dimension retaining tethers 9 so that a gap from an inflator mount portion 13 reaches a desired gap when the airbag main body 10 inflates and expands. One end side of the protrusion dimension retaining tether 9 is mounted on a back face side of the occupant constraint face, and the other end side is mounted on the inflator mount portion 13.

Next, with reference to FIGS. 3 (a), 3 (b), 4 (a), 4 (b), 5 (a) and 5 (b), a description will be given with respect to switching of the vent hole 8 to be controlled by means of the rectification cloth 3 from an opened state to a closed state, and further, switching from the closed state to the opened state. FIG. 3 shows an opened state of the vent hole 8 in a period in which there is a high possibility that an occupant established in the OOP state comes into contact with the airbag main body 10, i.e., in a period from the start of inflation and expansion of the airbag main body 10 to the completion of the initial stage.

As shown in FIG. 3(a), the rectification cloth 3 that is sandwiched between the guide base cloth 6 and the airbag main body 10 at this time is established in a state in which a redundant portion of the band-shaped portion 4 is slackened, the vent hole 8 is positioned between one pair of leg portions 5, and the vent hole 8 is established in an opened state. That is, the opening 6b of the guide base cloth 6 and the vent hole 8 each are established in an opened state. A part of the redundant portion of the band-shaped portion 4, which can be slackened, can also be inserted into the guide base cloth 6 after being folded in a zigzag manner.

Then, as indicated by the outline arrow in FIG. 3 (b), part of the gas in the airbag main body 10 can be evacuated to the outside of the airbag main body 10 through the opening 6b of the guide base cloth 6 and the vent hole 8.

With reference to FIG. 3 (a), a description will be given with respect to a state in which an occupant established in the OOP state comes into contact with the airbag main body 10 during a period from the start of inflation and expansion of the airbag main body 10 to the completion of the initial stage. Hereinafter, a description will be given by way of example of a construction in which the airbag main body 10 is arranged in a steering wheel, although not shown. If a vehicle collision or the like occurs, the airbag main body 10 of an airbag device, although not shown, starts inflation and expansion, and breaks a cover of the airbag device. Then, the airbag main body 10 that is arranged in the cover further performs inflation and expansion due to an inflation gas from a gas generator such as an inflator.

At this time, if an occupant established in the OOP state comes into contact with the airbag man body 10, the internal pressure of the airbag main body 10 rises, whereas as shown in FIG. 3 (b), the leg portions 5 are established in a slackened state; and therefore, the opening 6b of the guide base cloth 6 or the vent hole 8 is not closed by means of the rectification cloth 3. Accordingly, gas evacuation from the airbag main body 10 is continuously performed.

The occupant coming into contact with the airbag main body 10 is thereby received and constrained, so that the internal pressure of the airbag main body 10 can be lowered at a desired pressure reducing state. In this way, the internal pressure of the airbag main body 10 can be lowered at the desired pressure reducing state, so that the occupant can be reliably kept and constrained.

The state shown in FIG. 4 (a) is shown as a state in which the internal pressure of the airbag main body 10 reaches a predetermined internal pressure after the completion of the initial stage from the start of inflation and expansion of the airbag main body 10. In this state, the state of the airbag main body 10 having inflated and expanded is maintained for a predetermined period of time, so that gas evacuation from the vent hole 8 is prevented.

As shown in FIG. 4 (b), the end portion 5a of each of the leg portions 5 is engaged by means of sewing or the like, with the back face side on the occupant constraint face in the main panel 1. With this construction, after the initial stage of inflation and expansion has completed, if the airbag main body 10 reaches a desired inflated state, the leg portions 5 are pulled by means of the main panel 1 and then the leg portions 5 are established in a tense state. The band-shaped portion 4 is pulled by means of the leg portions 5 that are established in the tense state, and the two-way portion 5b of the leg portions 5 moves to a position that is distant from the vent hole 8.

Then, the band-shaped portion 4 is pulled in the first guide passageway 7a, and the vent hole 8 or the opening 6b of the guide base cloth 6 is closed. At this time, as indicated by the outline arrow in FIG. 4 (b), gas evacuation from the vent hole 8 is prevented.

When the leg portions 5 are established in a tense state, the band-shaped portion 4 is also pulled by means of the ear portion 12 between the main panel 1 and the main panel 2. However, as a length dimension of the band-shaped portion 4, a length dimension from the end part 4a of the band-shaped portion 4 to the two-way portion 5b is formed to be a length dimension that is substantially equal to a length dimension of the main panel 2 from the ear portion 12 to the two-way portion 6a of the guide base cloth 6, whereby the band-shaped portion 4 can be pulled in the first guide passageway 7a by means of the leg portions 5 that are established in the tense state.

Moreover, the tensile force in the horizontal direction acts on each of the leg portions 5, so that the tensile force in the vertical direction and the tensile force in the horizontal direction act on the band-shaped portion 4 at the same time, making it possible to prevent twisting of the band-shaped portion 4. Therefore, the rectification cloth 3 configured to close the vent hole 8 or the opening 6b of the guide base cloth 6 can reliably close the vent hole 8 or the opening 6b of the guide base cloth 5 without forming a gap relative to the vent hole 8 or the opening 6b of the guide base cloth 6.

In addition, the end portion 5a of each of the leg portions 5 is mounted on the back face side of the occupant constraint face in the main panel 1, so that when an occupant comes into contact with the occupant constraint face, recession of the occupant constraint face to the inside of the airbag main body 10 can be efficiently caused to work at the same time as such contact, and the tense state of each of the leg portions 5 can be released.

In place of providing the protrusion dimension restraining tether 9 shown in FIG. 1, or alternatively, as an assistance of the protrusion dimension restraining tether 9, a length dimension leading up to the occupant constraint face 10 in the airbag main body 10 can also be formed so as to be restrained by means of the respective leg portions 5 that are established in a tense state.

FIGS. 5 (a) and 5 (b) shows a state in which a head 14 of an occupant (a dummy doll) comes into contact with the airbag main body 10 when the airbag main body 10 inflates and expands and then enters the state shown in FIGS. 4 (a) and 4 (b). After the elapse of the initial stage of inflation and expansion in the airbag main body 10, when the airbag main body 10 inflates and expands in a state in which the vent hole 8 is closed, if the head 14 comes into contact with the airbag main body 10, the occupant constraint face in the main panel 1 of the airbag main body 10 is recessed, and the internal pressure of the airbag main body 10 rises to a predetermined internal pressure or more.

Then, the occupant constraint face is recessed, whereby the tense state of each of the leg portions 5 is released, the rectification cloth 3 is established in a slackened state, and a part of the rectification cloth 3 having closed the vent hole 8 or the opening 6b of the guide base cloth 6 protrudes from the vent hole 8 to the outside. Moreover, the protrusion quantity from the vent hole 8 in the rectification cloth 3 to the outside is controlled in accordance with the internal pressure of the airbag main body 10. In this manner, the occupant can be reliably constrained by means of the airbag main body 10.

As described above, the present invention is capable of reliably preventing the band-shaped portion 4 in the rectification cloth 3 from being established in a twisted state, and is also capable of switching the vent hole 8 from an opened state to a closed state, and further, switching it from the closed state to the opened state again. Moreover, when the vent hole is established in the closed state, the gas that is generated from an inflator that is a gas generator can be efficiently utilized for inflation and expansion of the airbag main body 10, so that a small-sized inflator can be employed as such an inflator.

Hereinbefore, while a construction in which a rectification cloth 3 is provided in a vent hole 8 of an external air release type has been described as a construction of the present invention, the present invention is not limitative to such a construction in which a rectification cloth is provided in a vent hole of an external air release type. The present invention is also applicable to a construction in which a rectification cloth is provided in a vent hole of an internal air release type. That is, in a construction in which a pressure adjusting bag that is a second chamber is provided outside of a first chamber, a rectification cloth can be provided in a vent hole of an internal air release type, the vent hole being provided to communicate between the first chamber and the second chamber.

Second Embodiment

Hereinafter, a second embodiment of the present invention will be described as another embodiment.

Figure 12:
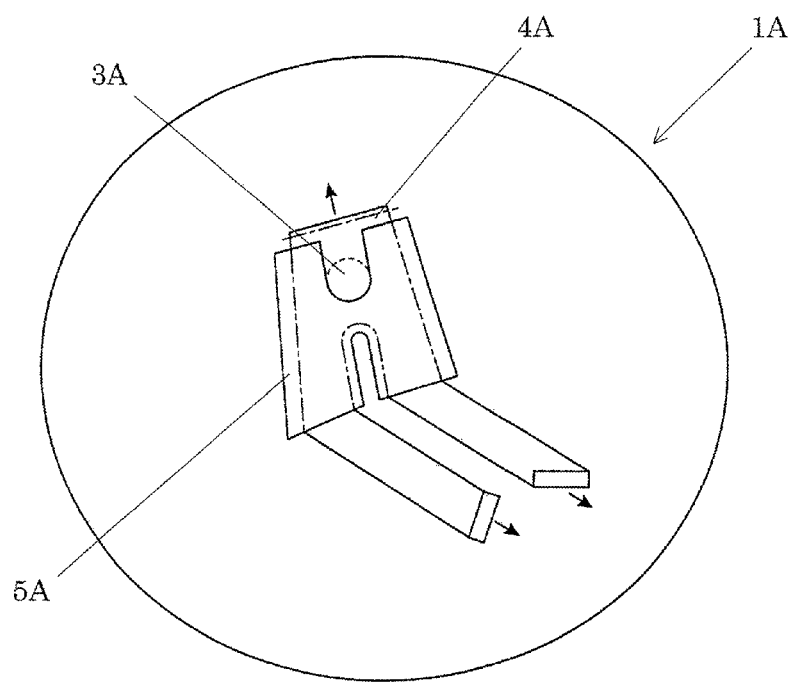
FIG. 12 is an imaginary view when seen from the inside of the airbag, the view showing a state in which the pulling member that is the base cloth valve being a feature in the airbag according to the present invention is mounted on the airbag.

First, the second embodiment of the present invention will be generally described. In the linear base cloth valve of the related art, there is a possibility that the base cloth valve becomes thin due to folding or distortion of the base cloth valve at the time of the maximum inflation and expansion of an airbag, and contrivance is required to stably and easily make an opening or closing operation of a gas excavation hole. Therefore, the airbag according to the present invention, as shown in FIG. 12, has: a gas excavation hole 3A; and a pulling member 4A configured to open or close the gas evacuation hole 3A, and has a first mount portion 7A of an occupant-side airbag portion 2A; a second mount portion 6A of a vehicle-side airbag portion 1A; and a closed portion that is disposed to be able to be superimposed on the gas evacuation hole 3A. The pulling member 4A is moved to be pulled by means of relative spacing between the occupant-side airbag portion 2A and the vehicle-side airbag portion 1A, the closed portion is configured so as to be partially superimposed on the gas evacuation hole 3A or so as to move to a restrictive position. The first mount portion 7A is constructed with a plurality of mount pieces, and is mounted at a plurality of mount points on the occupant side, and a distance between the pluralities of mount portions becomes greater than a dimension in original shape of the plurality of mount pieces of the pulling member 4A.

Figure 8:
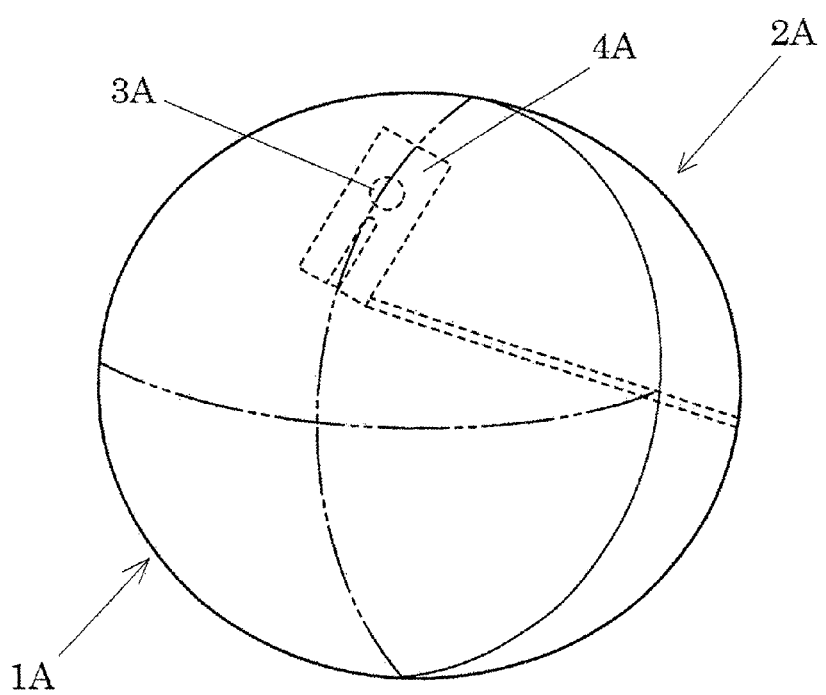
FIG. 8 is a schematic perspective view showing a second embodiment of a construction of an airbag according to the present invention.
Figure 9:
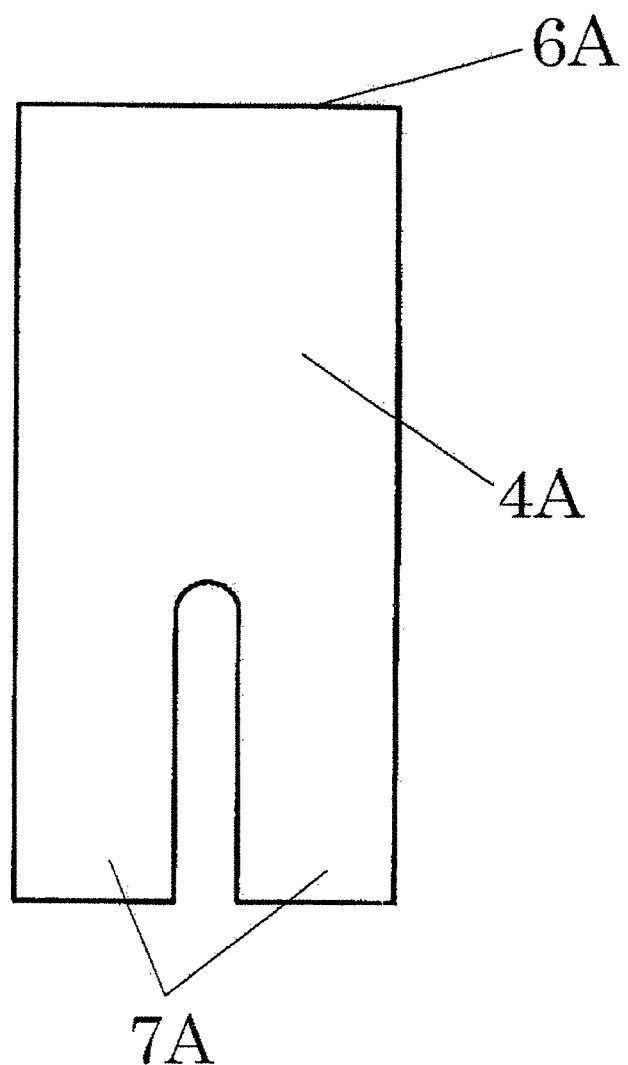
FIG. 9 is a schematic front view showing an example of a pulling member that is a base cloth valve after base cloth cutting in the airbag according to the present invention.
Figure 10:
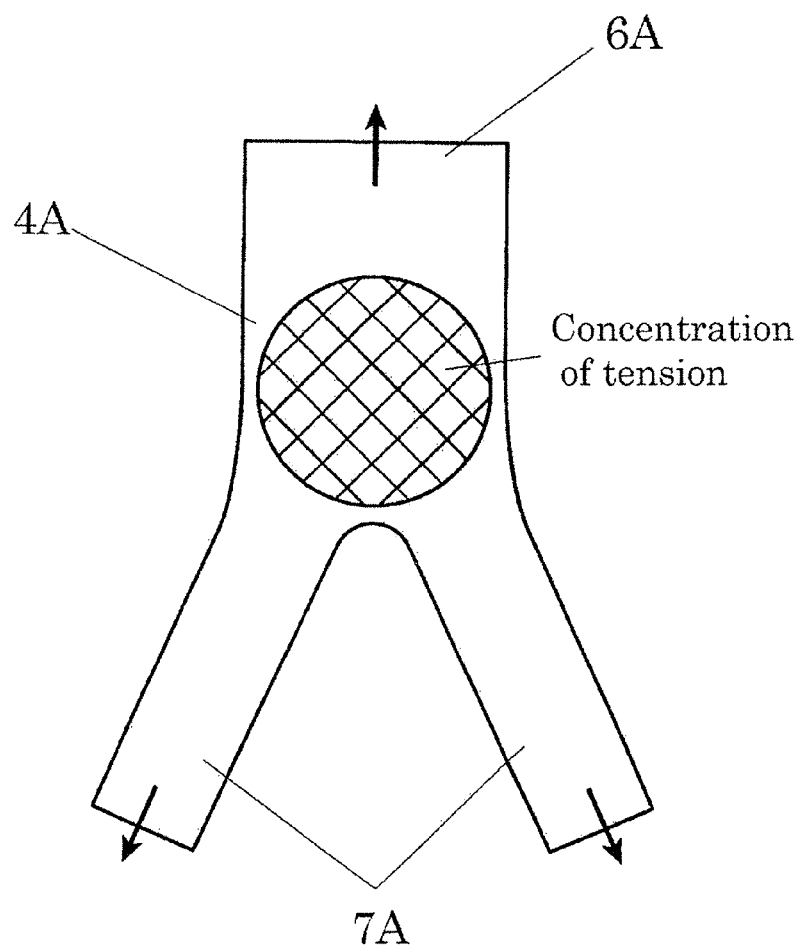
FIG. 10 is an explanatory view showing an advantageous effect of the pulling member that is a base cloth valve being a feature of the airbag according to the present invention.

Next, the second embodiment of the present invention, which has been generally described above, will be described in detail with reference to the accompanying drawings. FIG. 8 is a schematic perspective view showing a construction of an airbag according to the present invention. According to the airbag of the present invention, the gas excavation hole 3A for evacuating the gas that is contained in the airbag to the outside is provided in an inflation body of an opposite occupant-side main panel 1A of the airbag; the second mount portion 6A that is a linear portion of the pulling member 4A is sewn on the opposite occupants-side main panel 1A; and the first mount portion 7A that is the other end part of the pulling member 4A is formed in a two-way shape, and is configured to be sewn from the opposite occupant-side main panel 1A to the occupant-side main panel 2A. FIG. 9 shows the pulling member 4A after base cloth cutting. The pulling member 4A to be used in the present invention can be formed in a two-way shape by linearly cutting the first mount portion 7A of a linear base cloth; and therefore, the pulling member can be produced at a cost similar to that of the related art, regardless of the fact that there is attained an effect that is more advantageous than that of a pulling member 4A formed in a linear shape, of the related art, and the yields is also improved. FIG. 10 shows an advantageous effect of the pulling member 4A in the airbag of the present invention. The pulling member 4A of the present invention has: the second mount portion 6A that is a linear site; and the second mount portion 7A that is a site divided into two ways. If a respective one of these mount portions is pulled at the time of airbag expansion, a tension concentrates on a portion that is superimposed on the gas evacuation hole 3A for evacuating the gas that is contained in the airbag of the pulling member 4A to the outside, gas evacuation from the airbag is restrained, and airbag expansion suitable for occupant can be provided.

Figure 11:
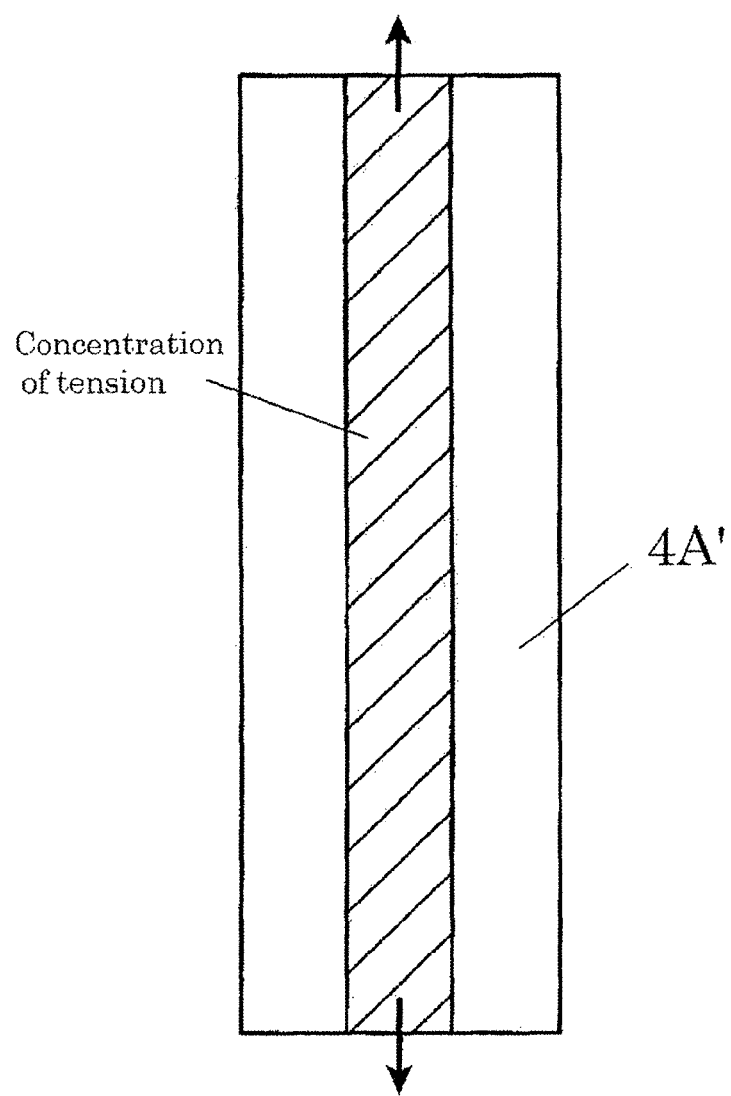
FIG. 11 is an explanatory view showing an advantageous effect of a pulling member according to the related art.

FIG. 11 shows the pulling member 4A' of the related art. Unlike that of the present invention, this pulling member is not divided into two ways; and therefore, a tension concentrates on the entire top and bottom from the center of the left and right. Accordingly, there may occur a case in which the pulling member is folded or distorted in the horizontal direction or the gas evacuation hole 3A cannot be sufficiently closed, and there is also a need to set a position of the base cloth valve or an acting point of pulling in folding of the airbag, or alternatively, to carry out an adjustment work of a guide structure in which smooth sliding can be obtained.

FIG. 12 is an imaginary view when seen from an inside of an airbag, the view showing a state in which a pulling member is mounted on the airbag. The pulling member 4A is provided at a position that is superimposed on the gas evacuation hole 3A for evacuating the gas that is contained in the airbag to the outside, and on the pulling member 4A, a pulling protection member 5A is provided. This pulling protection member 5A serves to help smooth sliding of the pulling member 4A, and has an advantageous effect of preventing floating of the pulling member 4A at the time of airbag expansion.

Figure 13:
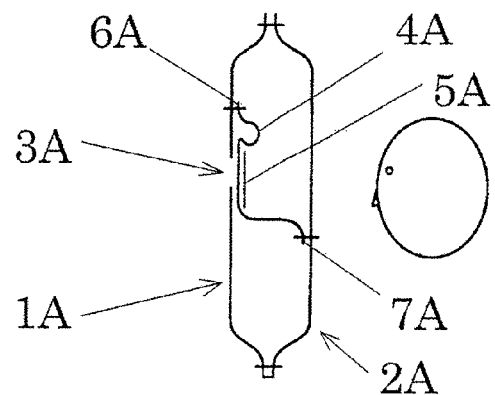
FIGS. 13(*a*), 13(*b*) and 13(*c*) are explanatory views showing a status change at the time of inflation and expansion of the airbag according to the present invention.
Figure 13:
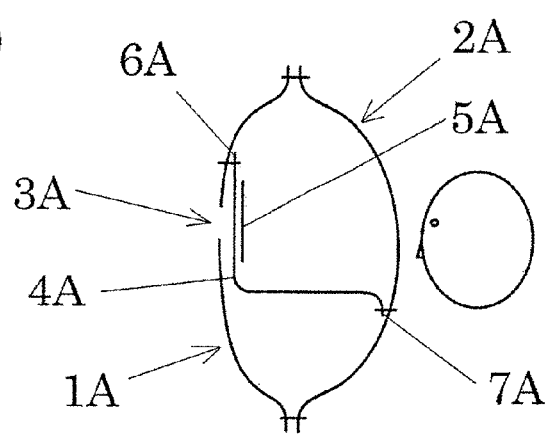
Figure 13:
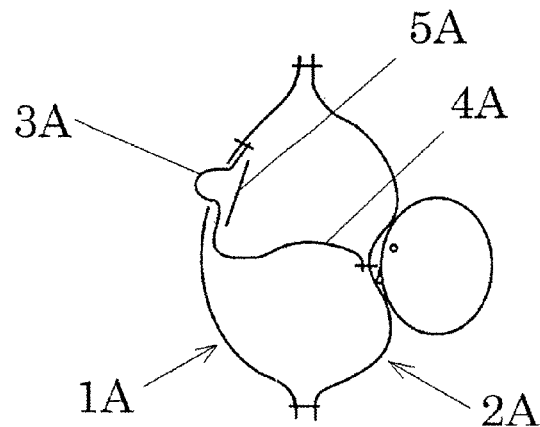

Next, an expansion status change of the airbag according to the present invention will be described with reference to FIGS. 13 (a), 13 (b) and 13 (c). FIG. 13 (a) shows a state immediately after airbag expansion. This airbag is on the way of expansion, and the first mount portion 7A that is a two-way portion of the pulling member 4A opens, whereby the gas evacuation hole 3A of the opposite occupant-side main panel 1A and the pulling member 4A are not superimposed on each other; and therefore, the gas evacuation hole 3A is established in an opened state. FIG. 13 (b) shows a state in which the airbag inflates and expands at the maximum, and shows a state in which the pulling member 4A is pulled, a linear portion that is not a two-way portion is superimposed on the gas evacuation hole 3A, and the gas evacuation hole 3A is closed. FIG. 13 (b) shows a state in which: an occupant comes into contact with the airbag; the occupant compresses the airbag; the pulling member 4A is superimposed on the gas evacuation hole 3A; in that state the pulling member 4A is pushed out from the gas evacuation hole 3A to the outside of the airbag by means of a movement caused by airbag compression; and therefore, the gas evacuation hole 3A is opened. Namely, an impact is applied; a change of the gas evacuation hole 3A from a time immediately after the start of airbag expansion to a time of the completion of airbag expansion is made in sequential order of open-close-open; when an occupant comes into contact with the airbag, an internal pressure of the airbag is established at the maximum; and a movement of the occupant to the airbag side is supported and then the impact is absorbed. After that, the internal pressure of the airbag is lowered so as to reduce a resistance force of airbag expansion to the occupant, and airbag expansion suitable for occupant is provided.

Another Embodiment

Here, another embodiment of the present invention will be described. FIG. 14 shows another embodiment of the pulling member 4A. A two-way portion that is provided in the first mount portion 7A is also provided in the second mount portion 6A that is on the opposite occupant-side main panel side as well as on the side of the occupant-side main panel 2A, and a force can be concentrated on a more limitative location by means of tension concentration from four directional ways.

Although not shown in the figure, on the first mount portion 7A and the second mount portion 6A, a pulling member 4A that is divided into multiple ways as well as into two ways can be employed.

INDUSTRIAL APPLICABILITY

A technical idea of the present invention can also be applied to a construction of another airbag. In addition, the present invention is also applicable to an airbag in a variety of modes and/or use locations, which is available for use in all kinds of vehicles.

What is claimed is:

1. An airbag device including an airbag that is folded, and that is expanded by means of an inflation gas that is supplied from an inflator, wherein
    the airbag has a gas excavation hole and a pulling member that is a base cloth valve configured to open or close the gas evacuation hole,
    the pulling member has: a first mount portion that is mounted on an occupant-side airbag portion when the gas evacuation hole is defined as a center; a second mount portion that is mounted on a vehicle-side airbag portion when the evacuation hole is defined as a center or that is mounted on a vehicle; and a closed portion that is disposed to be able to be superimposed on the gas evacuation hole;
    the pulling member that is the base cloth valve is moved to be pulled by means of relative spacing between the occupant-side airbag portion and the vehicle-side airbag portion, and the closed portion is formed so as to be at least partially superimposed on the gas evacuation hole or so as to move to a restrictive position, and
    the first mount portion is formed by a plurality of mount pieces, is mounted at a plurality of mount points at an occupant side, and is configured so that a distance between the plurality of mount portions is large relative to a dimension in an original shape of the plurality of mount pieces of the pulling member that is the base cloth valve.

2. The airbag device according to claim 1, wherein the first mount portion and the second mount portion are respectively formed by a plurality of mount pieces.

* * * * *